United States Patent [19]

Schruff

[11] Patent Number: 5,009,556
[45] Date of Patent: Apr. 23, 1991

[54] BLIND RIVETING NUT

[76] Inventor: Herbert Schruff, Reischelplatz 7, 5559 Föhren, Fed. Rep. of Germany

[21] Appl. No.: 351,960

[22] Filed: May 15, 1989

[51] Int. Cl.⁵ .............................................. F16B 13/04
[52] U.S. Cl. ....................................... 411/15; 52/707; 411/501
[58] Field of Search .................. 411/500, 34, 43, 15, 411/8, 9, 506, 38, 42, 427, 371, 373, 374, 375, 429, 376, 501, 432, 433, 917; 52/704, 707

[56] References Cited

U.S. PATENT DOCUMENTS

| 3,605,548 | 9/1971 | Mortensen | 411/44 |
| 4,295,761 | 10/1981 | Hansen | 411/8 X |

FOREIGN PATENT DOCUMENTS

| 2442759 | 3/1976 | Fed. Rep. of Germany | 44/55 |
| 1317261 | 1/1963 | France | 411/55 |
| 52-24655 | 2/1977 | Japan | 411/55 |
| 1328591 | 8/1987 | U.S.S.R. | 411/15 |
| 1250162 | 10/1971 | United Kingdom | 411/15 |
| 2067702 | 7/1981 | United Kingdom | 411/8 |

Primary Examiner—Rodney M. Lindsey
Attorney, Agent, or Firm—Barnes, Kisselle, Raisch, Choate, Whittemore & Hulbert

[57] ABSTRACT

A blind riveting nut comprises a hollow shank portion and a setting head thereon at one end thereof. Towards the other end the shank portion has an internal screwthread for receiving the pulling mandrel of a blind rivet setting tool while at the end remote from the setting head, the shank portion has an element which closes off the interior of the shank portion at that end but which can be removed from its closure position. The closure element may be of various configurations including a ball and a portion of closure material fitted over the appropriate end of the shank portion.

4 Claims, 1 Drawing Sheet

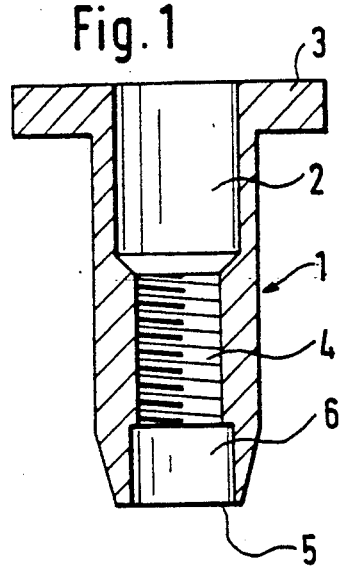
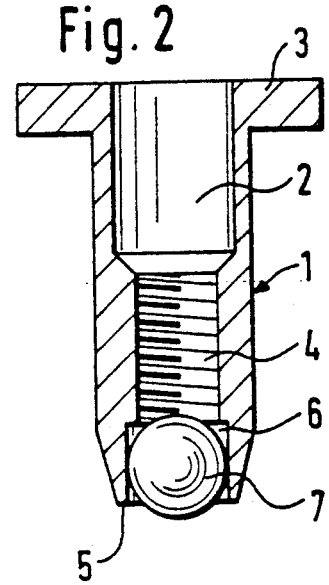
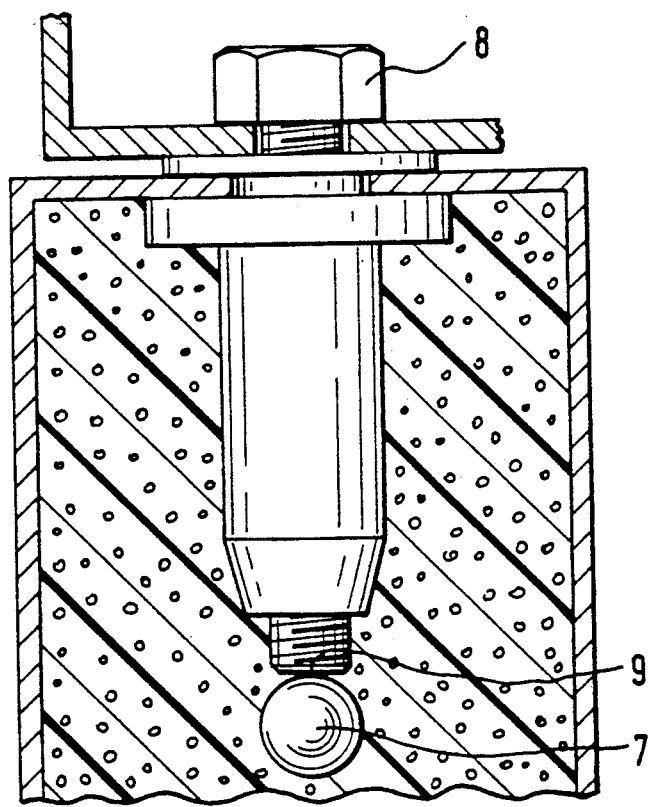

BLIND RIVETING NUT

BACKGROUND OF THE INVENTION

The invention relates to a blind riveting nut.

One form of a blind riveting nut comprises a hollow shank portion having a setting head at or towards one end thereof, and, towards the other end, a female screwthread within the shank portion for accommodating the pulling mandrel of a blind rivet setting tool. Thus in use of such a blind riveting nut the nut is fitted into a hole prepared for that purpose, and actuation of the blind rivet setting tool applies a pulling force to the shank portion to cause it to assume an upset configuration whereby the rivet nut is secured in the hole and can then receive for example a fixing bolt or stud.

Blind riveting nuts of that kind are produced with an open end or a closed end on the shank portion, at the end thereof remote from the head. A closed construction for a blind riveting nut is substantially more expensive than an open construction as, besides the more expensive blind hole screwthread, that riveting nut must also be of a greater length due to the fact that, besides the end closure portion, there must also be the space required for the tapering configuration formed by the tip of the drill producing the blind hole therein, as well as a certain safety margin at the closed end of the riveting nut, in regard to production thereof. If longer fixing screws are screwed into the screwthread in the shank portion, the length that the shank portion is required to be can be further increased. On the other hand, it is not possible to forego a closed end on the shank portion of such a riveting nut, if for example the interior of the workpiece in which the riveting nut is to be secured is filled with foam. If the end of the shank portion is not closed in that context, foreign materials pass into the screwthread therein, when the workpiece in question is filled with foam.

SUMMARY OF THE INVENTION

An object of the present invention is to provide a cost effective simplified blind riveting nut which affords enhanced versatility of use while being inexpensive to manufacture.

Another object of the present invention is to provide a blind riveting nut which can be used in situations such that use of an open riveting nut is not possible and a riveting nut of a closed configuration must be used.

Still another object of the present invention is to provide a blind riveting nut combining the advantages of an open design configuration and a closed design configuration.

In accordance with the present invention these and other objects are achieved in a blind riveting nut comprising a hollow shank portion with a setting head thereon at a first end thereof. Provided within the hollow shank portion towards or at the second end thereof is an internal screwthread for receiving the pulling mandrel of a blind rivet setting tool. Disposed at or towards the end remote from the setting head, the hollow shank portion is provided with a closure element which is capable of being removed from its closure position of closing the interior of the shank portion at said second end thereof.

In an advantageous embodiment of the present invention the closure element comprises a closure body which is clamped in position in the second end of the shank portion of the nut.

In another advantageous embodiment the closure element air-tightly closes off the shank portion with respect to the internal screwthread.

Still another advantageous embodiment of the invention provides that the closure element comprises a ball member while in a preferred form of that embodiment, the shank portion at the second end thereof has a portion which is free of the screwthread, with the closure element being carried in the screwthread-free portion.

In another alternative embodiment of the riveting nut of the invention, the closure element may comprise a thin closure body which is for example adapted to be pierced or deformed, being for example in the form of a thin metal plate portion or a plastic foil portion.

In a modified embodiment the closure element may comprise a screwthreaded portion which is disposed in and adapted to be screwed out of the shank portion.

Further objects, features and advantages of the present invention will be apparent from the following description of a preferred embodiment thereof.

BRIEF DESCRIPTION OF THE DRAWINGS

FIG. 1 is a sectional side view of a riveting nut according to the invention,

FIG. 2 is a view of the FIG. 1 riveting nut with a closure element inserted therein, and FIG. 3 shows an embodiment of the riveting nut according to the invention in the installed condition thereof, with the closure element having been disengaged from the riveting nut.

DESCRIPTION OF THE PREFERRED EMBODIMENT

Referring firstly to FIG. 1, shown therein is a blind riveting nut 1 comprising a hollow shank portion 2 and a setting head 3 which is disposed on the hollow shank portion 2 at the upper end thereof in FIG. 1. Provided within the shank portion 2 towards the lower end in FIG. 1 is an internal screwthread 4 into which can be screwed the pulling mandrel (not shown) of a tool (not shown) for setting the rivet by producing upsetting thereof.

The end 5 of the shank portion 2 which is at the end thereof remote from the setting head 3 and which is thus the lower end in FIG. 1 has a portion which is free of the screwthread 4, thus providing a screwthread-free recess portion 6.

Referring now to FIG. 2, shown therein is the FIG. 1 riveting nut in conjunction with a closure element 7 in the form of a ball, which is fitted into the recess portion 6, for example by being suitably pressed thereinto.

Referring now to FIG. 3, it will be seen therefrom that, in the position of use of a riveting nut as shown in FIGS. 1 and 2, the riveting nut is fitted into a suitably prepared hole (not referenced) and then the shank portion 2 thereof is upset by actuation of the rivet setting tool, to cause the rivet to be clamped in position with a portion of the workpiece in which the rivet is fixed being gripped between the setting head 3 and the upset part of the shank portion 2. When, as shown in FIG. 3, a blind riveting nut of that kind is set in position and the workpiece is subsequently filled for example with foam, foreign material cannot pass into the screwthread 4, by virtue of the open end of the shank portion being closed off by the ball 7.

On the other hand, when a screw 8 is introduced into the riveting nut after the foam has set sufficiently, the front screwthreaded end portion 9 thereof may extend out of the corresponding end of the shank portion 2, thereby displacing the closure element or ball 7 out of the recess portion 6, giving the arrangement shown in FIG. 3. In that way it is possible to operate with screws 8 of any length, without the riveting nut 1 having to be of a corresponding length.

It will be appreciated that the closure element 7 may also be of a different configuration from that shown and the screwthread-free recess portion 6 at the end 5 of the shank portion 2 may be matched thereto.

It is also possible, instead of a ball 7, for the closure element to comprise a thin closure body which for example can be pierced or deformed, being for example in the form of a thin metal plate portion or a plastic foil; when the rivet has been set, the front screwthreaded portion 9 of a screw 8 can then deform or pierce the thin closure body as required.

It is also possible for the closure element to comprise a screwthreaded portion which is disposed in the end of the shank portion 2 and which can be screwed out of same by a screw 8 when it is appropriately screwed into and through the screwthread 4 within the shank portion 2.

The invention thus provides a blind riveting nut affording the advantages of an open design configuration but which can be used in situations requiring blind riveting nuts with a closed shank portion.

It will be appreciated that the above-described construction in accordance with the invention has been set forth solely by way of example and illustration thereof and that various other modifications and alterations may be made therein without thereby departing from the spirit and scope of the invention.

What is claimed is:

1. A blind riveting nut comprising a hollow shank portion having first and second ends, a setting head at the first end, an internal screwthread at least adjacent the second end, for receiving the pulling mandrel of a blind rivet setting tool and a closure element disposed at the second end of the shank portion, said closure element comprising a closure ball which is press fitted into said second end of the shank portion, said closure ball being separate from and completely removable from its closure portion of closing the shank portion at said second end thereof.

2. A nut as set forth in claim 1 wherein said shank portion at said second end has a region which is free of the screwthread and therein said closure ball is carried in said screwthread-free region.

3. A nut as set forth in claim 1 wherein said closure ball closes off the shank portion air-tightly with respect to the internal screwthread.

4. A blind riveting nut comprising: an elongate shank portion having first and second ends; an opening extending through the length of said shank portion and opening at said first and second ends thereof; a setting head on the shank portion at said first end thereof; a removable closure ball adapted to be disposed at said second end of said shank portion in closing press fitted relationship therewith thereby to close off the opening through said shank portion at said second end thereof; and an internal screwthread in said opening through said shank portion, intermediate said first and second ends thereof.

* * * * *